Jan. 10, 1950 H. F. OBERGFELL 2,494,450

UNIVERSAL TELEPHONE INSTRUMENT

Filed Jan. 1, 1945 3 Sheets-Sheet 1

INVENTOR.
HERBERT F. OBERGFELL, DECEASED
AMANDA OBERGFELL, EXECUTRIX

BY

ATTORNEY

Jan. 10, 1950 H. F. OBERGFELL 2,494,450

UNIVERSAL TELEPHONE INSTRUMENT

Filed Jan. 1, 1945 3 Sheets-Sheet 2

INVENTOR.
HERBERT F. OBERGFELL, DECEASED
AMANDA OBERGFELL, EXECUTRIX

BY Chas. W. Candy.

ATTORNEY

Jan. 10, 1950 H. F. OBERGFELL 2,494,450

UNIVERSAL TELEPHONE INSTRUMENT

Filed Jan. 1, 1945 3 Sheets-Sheet 3

INVENTOR.
HERBERT F. OBERGFELL, DECEASED
AMANDA OBERGFELL, EXECUTRIX

BY Chas. W. Candy

ATTORNEY

Patented Jan. 10, 1950

2,494,450

UNITED STATES PATENT OFFICE 2,494,450

UNIVERSAL TELEPHONE INSTRUMENT

Herbert F. Obergfell, deceased, late of River Forest, Ill., by Amanda Obergfell, executrix, River Forest, Ill., assignor to Automatic Electric Laboratories, Inc., Chicago, Ill., a corporation of Delaware Application January 1, 1945, Serial No. 570,910

1 Claim. (Cl. 179—100)

This invention relates in general to telephone instruments but has particular reference to convertible instruments.

The principal object of the invention is to provide a telephone instrument of unique design which can, without any alteration, be used as a wall or a desk telephone.

Another object is to provide an instrument having a case equipped with a plurality of openings for accommodating a plurality of spare parts or sets of spare parts which result in furnishing a telephone instrument which may be used as a magneto, common battery or automatic instrument. The instrument may also be equipped with parts and wired for local battery, local battery talk and common battery signaling or local battery anti-side tone, simplex dialing or any one of several other circuit combinations.

In my improved telephone which provides this interchangeability the instrument is provided with a case which consists of two separately moulded units of phenolic condensation product arranged to fit snugly together and to be held in place by two screws. One unit being a back board or base assembly and the other a cover assembly. A portion of the complete apparatus parts and materials are permanently mounted on the base and the balance are mounted on the cover. A formed cable is used to complete the interconnections between the parts which are attached to the base and the balance which are attached to the cover.

The cover is provided with a removable projecting portion which is mounted in an opening near the top of the front of the case and which is arranged to support the transmitter and receiver when these are supplied as a handset unit. The projecting portion may be removed and replaced by an ordinary transmitter mounting arm for mounting a transmitter, the telephone would then be equipped with a separate receiver. A receiver hook would be added at one side of the instrument to support this receiver in such a manner that it may cause operation of the same set of switch hook springs as previously operated by the handset.

I have also provided a plurality of sets of parts which are interchangeable and the unique arrangement of these has conserved space to the fullest extent resulting in a compact telephone instrument for universal application. The instrument may be wired in accordance with different circuits as required.

Other features of the invention will become apparent from the following description together with the accompanying drawings, consisting of eight figures on three sheets.

Figure 1 is a front view of the instrument equipped with a handset and magneto. A dial is fitted in the lower one of the two large openings in the front part of the cover. This type may be used as a wall or desk set without alteration.

Figure 1:
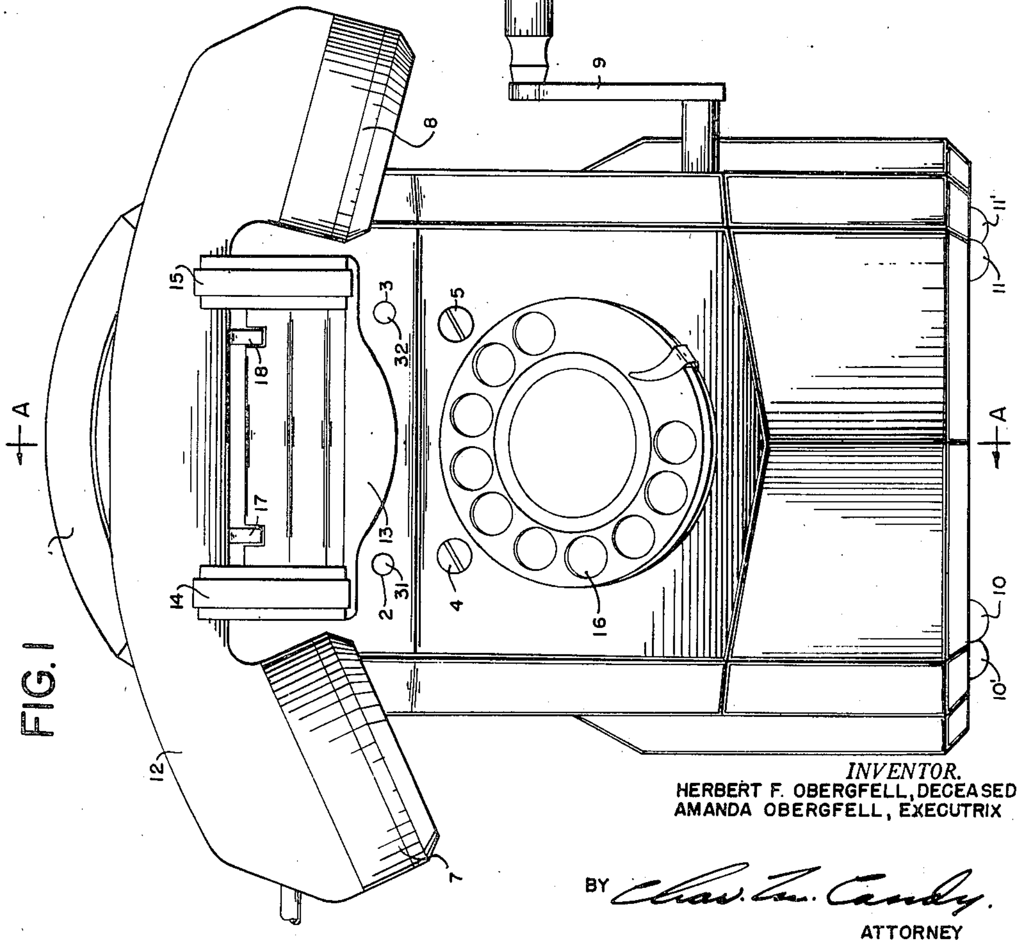

The transmitter 7 and the receiver 8 of the instrument shown in Fig. 1 are combined into a handset 12 which rests on a cradle or bracket assembly 13. The moulded extensions 14 and 15, of this bracket assembly have their top edges shaped to accommodate the handset handle and to prevent it being dislodged. Four rubber feet, as 10, 10′, 11 and 11′ in Fig. 1 have been firmly fitted to the bottom of the cover member, to give added protection to the surface on which the telephone is placed when used as a desk set.

Figure 2:
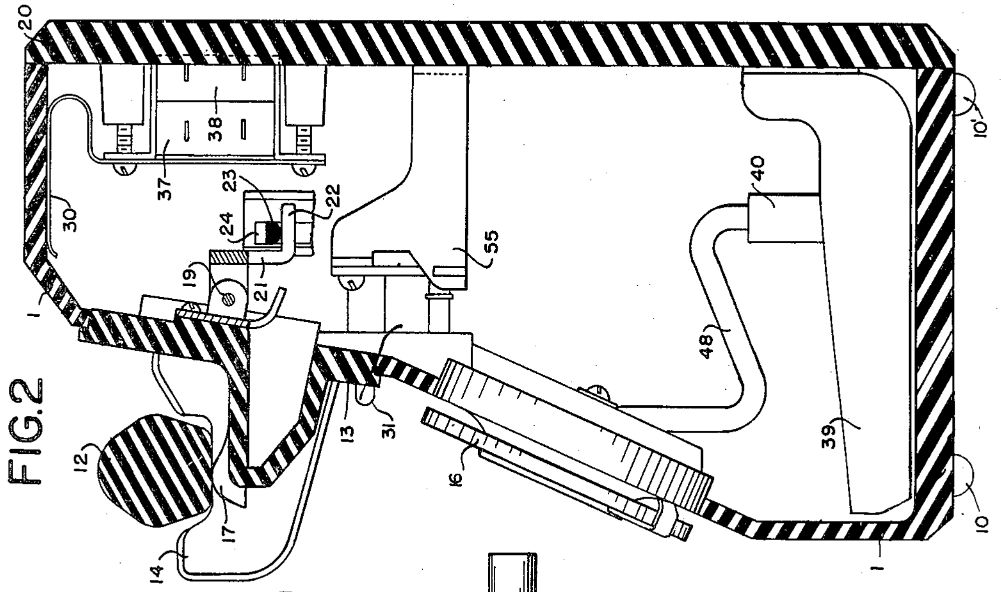
Figure 2 is a sectional view on the line AA of Fig. 1 with a full view of certain parts, with certain parts omitted.

The cover member 1, shown in Figs. 1 and 2, is moulded into the shape disclosed, from a plastic material or phenolic condensation product and is in one piece, with a plurality of openings to accommodate the various sets of parts required to complete the several types of instruments, into which it may be converted.

Figure 4:
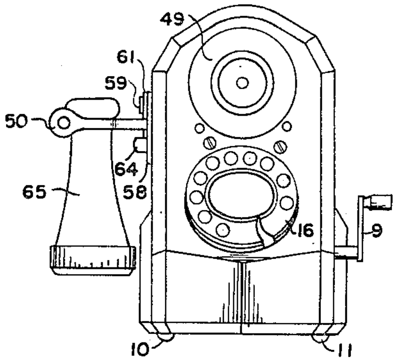
Figure 4 is a front view of the instrument equipped with a conventional type transmitter and receiver, a generator and a dial for automatic operation. This type may be used as a wall or desk set without alteration.
Figure 5:
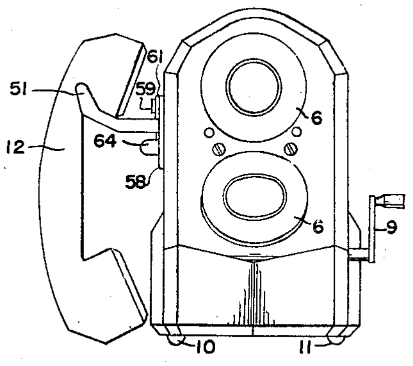
Figure 5 is the front view of an instrument equipped with a handset at the left supported by a switch hook instead of by a removable projecting cradle assembly, as in Figs. 1 and 2. This instrument has a magneto and, with the handset at the left, is normally used only as a wall set.
Figure 6:
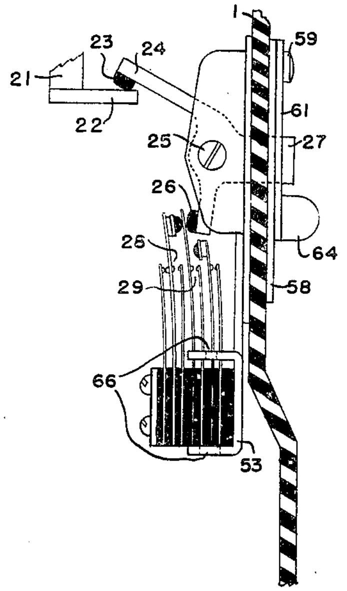
Figure 6 is a view from the rear, of a portion of the cover, and shows the switch hook springs and their actuating lever. It also shows a bracket drilled to fit over an N-shaped hinge member supported by the base.
Figure 7:
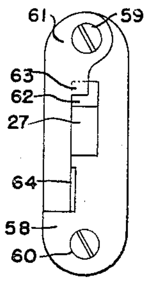
Figure 7 is a view of the switch hook escutcheon showing the mechanical lock.

On the right and left sides of the cover member near the bottom of Fig. 1, openings have been arranged, but not shown, consisting of a plurality of parallel equally spaced slots to provide outlets for the sounds from the ringer gongs. Another opening on the left side near the top, shown only in Figs. 2, 6 and 7, provides means for inserting a hook 50 or 51 or a lever 27, any of which will be attached to the switch assembly, Fig. 6, inside of the cover wall. This opening is covered by the escutcheon 58 which is illustrated in Fig. 7. There are two large openings which will be understood from Fig. 2, in which the top opening accommodates the cradle or bracket assembly 13. This can be removed and a transmitter mounting arm substituted, said arm to support a conventional type transmitter 49 as shown in Fig. 4, or a blank 6 as in Fig. 5. The lower of these large openings may be equipped with a dial 16, as in Figs. 1, 2 and 4, or a dial and transmitter blank 6, as in Fig. 5. There are two openings 2 and 3 in the front of cover member 1, through which the ends of two push plungers 31 and 32 (Fig. 3) protrude when the cover 1 is mounted on the base 20. The cover 1 may be removed and replaced without disturbing the push plunger or the spring sets 35 and 36, shown in Fig. 3, which are actuated by the plungers. One of these push plungers 31, is shown in Fig. 2. Two screws 4 and 5, shown in Fig. 1, pass through holes in the cover assembly 1 and are fixed into threaded holes 33 and 34 (Fig. 3) in the front plate of a bracket assembly, which is attached to the backboard or base assembly to secure the cover to the base.

Figure 3:
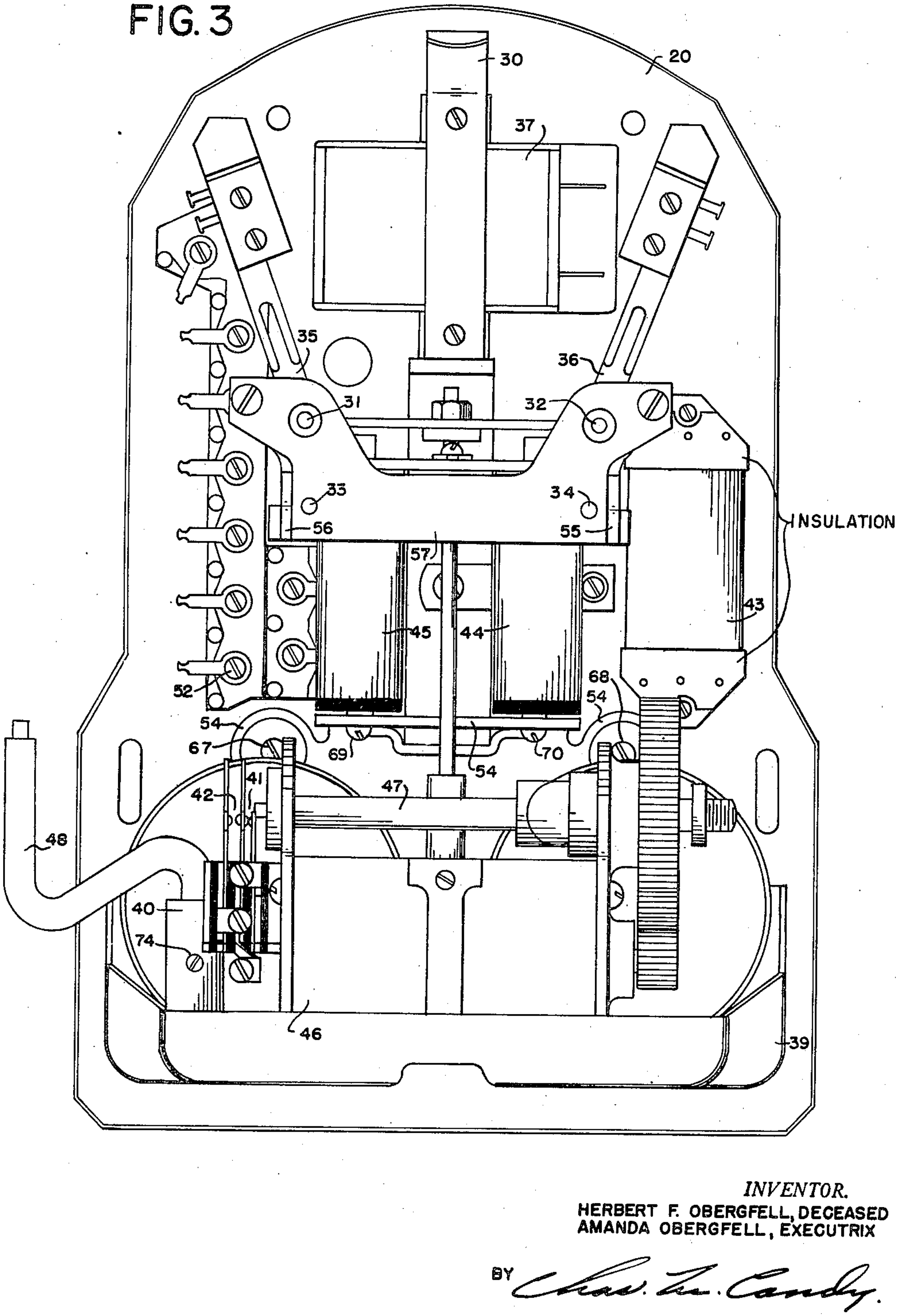
Figure 3 is a view of the backboard or base with the cover removed, showing the apparatus mounted thereon.

The second moulded member, the backboard or base 20, is shown in Fig. 3 and a partial sectional view, Fig. 2, forms the support for the apparatus attached thereto and also as an insulator between the terminals. The terminal studs and screws 52 are fastened directly into this base 20 without the necessity of furnishing separate connecting blocks. When the instrument is used as a wall telephone, the base is first firmly mounted on a wall, after which the cover member 1 may be placed in position and fastened by the screws 4 and 5.

Figure 8:
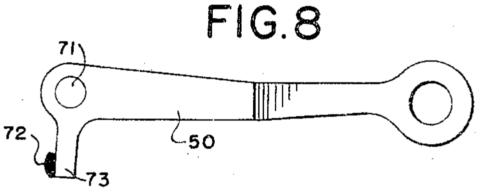
Figure 8 is a view of a conventional type switch hook which can be substituted for the double arm lever used with the cradle assembly.

The cradle or bracket assembly 13 includes the lever members 17 and 18 (Fig. 1), also lever 17 is shown in Fig. 2. The two levers are rigidly fastened together inside of the wall of assembly 13 and arranged to move up and down on the axis 19. Attached to and movable down and up with levers 17 and 18, is a right angle shaped bracket member 21. It will be seen that when the handset 12 is in the position shown in Figs. 1 and 2, the outer end of levers 17 and 18 will be held down and the right angled member 21 will be held up to the position shown in Fig. 2. However, when the handset is removed from the shelf, the outer ends of levers 17 and 18 are free to move upwards, under pressure from the hook switch springs (Fig. 6), communicated to levers 17 and 18 through a second lever 27. It will be noted from Fig. 6 that lever 27 may be moved about the axis 25. The switch springs maintain pressure on one arm of lever 27, that is, pressure in a right hand direction (Fig. 6) against bushing 26. This causes the upper end 24 of the lever 27, to move downwards and, at its bushing 23, carries with it one end 22 of the right angle shaped member 21. It will be understood from the above that the removal of the handset and later its replacement on the shelf will close and open the contacts of the hook switch. Also it should be noted that after the shelf or cradle has been removed for the purpose of converting the instrument from the types shown in Figs. 1 and 2 to the types shown in Figs. 4 and 5, the lever 27 will be removed entirely and in its place a switch hook, such as 50 shown in Fig. 8. The screw 25 passes through hole 71, holding hook 50 in place but leaving it free to move on screw 25 as an axis. The lower end 73 of hook 50 carries the bushing 72 which rests against the switch hook springs, and will communicate to said springs the up and down movements of the outer end of hook 50. It will be noted that lever 50 does not require an upper arm, such as end 24 of lever 27. Thus the switching springs will be operated by the lifting and replacing of the handset on the cradle or by the same actions when the set is equipped with either one of the types of switch hooks, illustrated in Figs. 4, 5 and 8.

Figs. 6 and 7 show the escutcheon which is attached by two screws 59 and 60 to one side of the cover member 1. These screws also support the switch hook spring assembly on the inside wall of the cover. The upper screw 59, also holds in place the latch lever 61, but so arranged as to allow the latch lever to move freely backward and forward, on screw 59 as an axis. In Fig. 7 the latch lever 61 is in its normal position and when the instrument is equipped with a shelf or bracket 13 to support a handset 12, the lever 27 is in the position shown with the handset on the shelf. Should the handset 12 be lifted from the shelf 13, thus relieving the pressure from the outer ends of levers 17 and 18, the lever 27 will move upwards through the space 62 and come to rest against the shoulder 63 of the latch lever 61. This slight movement allows one set of springs in the switch hook spring assembly to make contact, such as 28, Fig. 6, which performs certain circuit functions such as listening in on a party line before the same is seized. According to the wishes of the telephone user, he may, with slight pressure towards the left on the outturned end 64 of lever 61 cause the shoulder 63 to release lever 27, and under pressure of the switch hook springs, lever 27 will complete its stroke, thus closing contact 29 to perform other circuit functions such as seizing the line. A unique feature of this arrangement is that the latch will function with the cradle and handset types of telephones as shown in Figs. 1 and 2 or with the types using a hook at one side for supporting a receiver or a handset, as shown in Figs. 4 and 5.

The holes 2 and 3 in Fig. 1, through the cover are arranged so that the cover 1 may be removed and replaced without disturbing the push button plungers 31 and 32 or the spring sets 35 and 36 operatable by said plungers. The ends of the plungers protrude beyond the front surface of the cover 1 as shown in Fig. 2, when the cover 1 is mounted in its proper position and held in place against the backboard 20. The spring sets 35 and 36, shown in Fig. 3, maintain pressure on the push plungers in a direction away from the backboard, that is, to the left in Fig. 2. These plungers are non-locking and therefore during use are manually held into operated position and released when they have performed their respective circuit functions.

A sub-base of metal 39 (Figs. 2 and 3) is provided, and attached to the backboard with screws. This base forms a support for the generator 46. A pedestal 40 is also mounted on this sub-base, provided with a hole in the top to receive one end of an N-shaped hinge member 48. A retaining screw 74 is provided to prevent the N-shaped member 48 from being withdrawn from the pedestal 40 but leaving it free to be rotated back and forth and to carry with it the cover assembly with its equipment. The top or other end of the N-shaped member which stands in a vertical position is shaped to fit holes 66 in bracket 53, in Fig. 6, on the inside of the cover assembly.

After the two screws 4 and 5 have been loosened, the cover can be brought forward a certain distance, this distance is limited by the length of the formed cable linking the base and cover. The cover is now placed in a position so that the bracket 53 inside the cover comes to rest on the N-shaped member 48 which now wholly supports the cover so that it may be rotated to the left a sufficient distance to give the workman access to the equipment and wiring inside of the cover and the equipment mounted on the backboard.

The bracket 54 (Fig. 3) attached with screws 67 and 68 to the backboard is of unusual design and serves to support the ringer gongs and the ringer movement. The ringer coils are secured to bracket 54 by screws 69 and 70. Another bracket, partially shown in Figs. 2 and 3, which is attached to the backboard, has two members 55 and 56 extending forward at right angles to the backboard, with a cross member 57 secured thereto at the forward end, forms a mounting for the two non-lock push buttons or plungers 31 and 32, one at the right and one at the left underneath the handset cradle or bracket.

In the center, near the top of the backboard, space is available for mounting one or more condensers, as 37 and 38. A spring bracket 30, Figs. 2 and 3, is held in position by the same screws which hold the condenser clamping bracket. This spring bracket 30 acts as a guide when the cover 1 is being placed over the apparatus preparatory to inserting and adjusting the screws 4 and 5 which hold the cover 1 in place against the backboard 20.

When the instrument is equipped with a magneto 46, in Fig. 3, the magneto crank 9 in Fig. 1 must be removed before the cover member 1 can be detached from the backboard. After the cover is again in place and the screws 4 and 5 are firmly set, the magneto crank can be attached. The magneto 46 is the conventional type, in which a portion of the shaft 47 moves to the left (Fig. 3), when the crank is being turned in a clockwise direction. This movement causes the left end of the shaft to actuate a spring set and thus performing certain circuit functions. In Fig. 3 part 43 is an induction coil which is one of the parts which may be changed to conform to the type of instrument to be provided. Items 44 and 45 are the ringer coils.

A telephone equipped as in Fig. 1 may be used as a wall set or a desk set. As a wall set the telephone line wires are brought into the instrument and terminated on a pair of terminals within the instrument. To convert for use as a desk set it is customary to add an extra item, a desk set card, one end of which is connected to the terminals inside of the instrument and the other end terminates on a terminal block which would be attached to one side of the desk.

Having described the invention, what is considered to be new and desired to have protected by Letters Patent will be pointed out in the appended claim.

What is claimed is:

In a convertible telephone instrument having a base capable of receiving a switch hook and having a front opening capable of receiving a cradle with a cradle lever operable therefrom, a side aperture in said base, an escutcheon mounted on said base and having a central aperture in register with said side aperture through which either the switch hook or the cradle lever extends, a latch pivoted on said escutcheon, a spur piece on said latch for limiting the movement of either the switch hook or the cradle lever in said apertures, said latch manually pivotable to move said spur piece and allow further movement of either the switch hook or the cradle lever within said apertures, and switching springs mounted within said base and operable by either of said limited and further movements.

AMANDA OBERGFELL,
*Executrix of the Estate of Herbert F. Obergfell, Deceased.*

REFERENCES CITED

The following references are of record in the file of this patent:

UNITED STATES PATENTS

| Number | Name | Date |
|---|---|---|
| 1,130,522 | Kramer | Mar. 2, 1915 |
| 1,201,083 | Oldfield | Oct. 10, 1916 |
| 1,247,796 | Dean | Nov. 27, 1917 |
| 1,368,241 | Crawford | Feb. 15, 1921 |
| 1,432,883 | Lysons | Oct. 24, 1922 |
| 1,590,355 | Erickson et al. | June 29, 1926 |
| 1,606,388 | Scharringhausen | Nov. 9, 1926 |
| 1,734,124 | Green et al. | Nov. 5, 1929 |
| 1,824,705 | Cadieux | Sept. 22, 1931 |
| 2,076,244 | McLarn | Apr. 6, 1937 |
| 2,279,713 | McLarn | Apr. 14, 1942 |
| 2,348,592 | Beardsley | May 9, 1944 |
| 2,365,481 | McLarn | Dec. 19, 1944 |

FOREIGN PATENTS

| Number | Country | Date |
|---|---|---|
| 145,380 | Great Britain | July 2, 1920 |